US012759558B2

(12) United States Patent
Jo et al.

(10) Patent No.: US 12,759,558 B2
(45) Date of Patent: Oct. 13, 2026

(54) CONVOLUTIONAL NEURAL NETWORKS FOR PAVEMENT ROUGHNESS ASSESSMENT USING CALIBRATION-FREE VEHICLE DYNAMICS

(71) Applicant: ARIZONA BOARD OF REGENTS ON BEHALF OF THE UNIVERSITY OF ARIZONA, Tucson, AZ (US)

(72) Inventors: Hongki Jo, Tucson, AZ (US); Jong-Hyun Jeong, Tucson, AZ (US); Gregory Ditzler, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 408 days.

(21) Appl. No.: 18/554,891

(22) PCT Filed: Apr. 15, 2022

(86) PCT No.: PCT/US2022/025080
§ 371 (c)(1),
(2) Date: Oct. 11, 2023

(87) PCT Pub. No.: WO2022/221701
PCT Pub. Date: Oct. 20, 2022

(65) Prior Publication Data

US 2024/0193407 A1 Jun. 13, 2024

Related U.S. Application Data

(60) Provisional application No. 63/175,369, filed on Apr. 15, 2021.

(51) Int. Cl.
*B60W 40/06* (2012.01)
*G06N 3/0464* (2023.01)
(Continued)

(52) U.S. Cl.
CPC ........... *B60W 40/06* (2013.01); *G06N 3/0464* (2023.01); *G06N 3/084* (2013.01); *G06N 3/09* (2023.01); *G07C 5/02* (2013.01); *B60W 2552/35* (2020.02)

(58) Field of Classification Search
None
See application file for complete search history.

(56) References Cited

U.S. PATENT DOCUMENTS

| | | | | |
|---|---|---|---|---|
| 7,421,334 | B2 * | 9/2008 | Dahlgren | G01C 21/3691 701/408 |
| 10,147,002 | B2 * | 12/2018 | Hartmann | G06T 3/40 |

(Continued)

FOREIGN PATENT DOCUMENTS

| | | | | |
|---|---|---|---|---|
| CN | 113191291 A | * | 7/2021 | G06N 3/045 |
| CN | 115600086 A | * | 1/2023 | G06N 3/04 |

(Continued)

OTHER PUBLICATIONS

Jeong, Jong-Hyun, and Hongki Jo. "Toward Real-world Implementation of Deep Learning for Smartphone—Crowdsourced Pavement Condition Assessment." IEEE Internet of Things Journal (2023).

(Continued)

*Primary Examiner* — Kevin R Steckbauer
(74) *Attorney, Agent, or Firm* — NGUYEN TARBET IP LAW

(57) ABSTRACT

The present invention is directed to a method of identifying road roughness by collecting sensor data from a computing device and applying deep learning techniques to estimate the road's roughness index. The present invention features a system comprising computing devices. Each computing device may be mounted to a vehicle. Each computing device may be capable of measuring, while the vehicle is driving on a road. GPS, driving speed, vertical acceleration, and angular velocity of pitch motion. The system may further com-
(Continued)

prise a neural network computing device comprising a CNN comprising convolutional layers and global average pooling layers. The CNN may be trained by a data set comprising previous data from the plurality of computing devices. The CNN may be capable of accepting the plurality of parameters from the computing devices as input and generating an international roughness index (IRI) value of the road as output.

19 Claims, 7 Drawing Sheets

(51) Int. Cl.

| | |
|---|---|
| ***G06N 3/084*** | (2023.01) |
| ***G06N 3/09*** | (2023.01) |
| ***G07C 5/02*** | (2006.01) |

(56) References Cited

U.S. PATENT DOCUMENTS

| | | | | |
|---|---|---|---|---|
| 12,018,953 | B2 * | 6/2024 | Bradlow | B62J 50/22 |
| 12,345,567 | B2 * | 7/2025 | Chen | G01H 9/004 |
| 2011/0012901 | A1 * | 1/2011 | Kaplanyan | G06T 15/506<br>345/426 |
| 2016/0173667 | A1 * | 6/2016 | Torres Gutierrez | H02J 7/342<br>455/575.1 |
| 2020/0082264 | A1 * | 3/2020 | Guo | G06N 3/09 |
| 2020/0124430 | A1 * | 4/2020 | Bradlow | B62J 45/412 |
| 2020/0279157 | A1 * | 9/2020 | Gao | G06F 18/24133 |
| 2023/0152150 | A1 * | 5/2023 | Chen | G01H 9/004<br>73/655 |
| 2024/0193407 | A1 * | 6/2024 | Jo | B60W 40/06 |

FOREIGN PATENT DOCUMENTS

| | | | | | |
|---|---|---|---|---|---|
| CN | 115600086 | B | * | 4/2023 | G06N 3/04 |
| CN | 119711301 | A | * | 3/2025 | |
| WO | WO-2019113022 | A1 | * | 6/2019 | G01B 21/30 |
| WO | WO-2022221701 | A1 | * | 10/2022 | G06N 3/084 |
| WO | WO-2023091447 | A1 | * | 5/2023 | G01H 9/004 |

OTHER PUBLICATIONS

Jeong, Jong-Hyun, Hongki Jo, and Gregory Ditzler. “Convolutional neural networks for pavement roughness assessment using calibration-free vehicle dynamics.” Computer-Aided Civil and Infrastructure Engineering 35.11 (2020): 1209-1229.

Alessandroni, Giacomo, Alberto Carini, Emanuele Lattanzi, Valerio Freschi, and Alessandro Bogliolo. 2017. “A Study on the Influence of Speed on Road Roughness Sensing: The SmartRoadSense Case” Sensors 17, No. 2: 305.

Zhang, A., Wang, K. C., Fei, Y., Liu, Y., Chen, C., Yang, G., . . . Qiu, S. (2019). Automated pixel-level pavement crack detection on 3D asphalt surfaces with a recurrent neural network. Computer-Aided Civil and Infrastructure Engineering, 34(3), 213-229.

Abdel-Hamid, O., Mohamed, A. R., Jiang, H., Deng, L., Penn, G., & Yu, D. (2014). Convolutional neural networks for speech recognition. IEEE/ACM Transactions on Audio, Speech, and Language Processing, 22(10), 1533-1545.

Adeli, H. (2001). Neural networks in civil engineering: 1989-2000. Computer-Aided Civil and Infrastructure Engineering, 16(2), 126-142.

Adeli, H.,&Hung, S. L. (1994). An adaptive conjugate gradient learning algorithm for efficient training of neural networks. Applied Mathematics and Computation, 62(1), 81-102.

Ambrosini, L., Gabrielli, L., Vesperini, F., Squartini, S., & Cattani, L. (2018). Deep neural networks for road surface roughness classification from acoustic signals. Audio Engineering Society Convention 144. Audio Engineering Society.

Bang, S., Park, S., Kim, H., &Kim, H. (2019). Encoder-decoder network for pixel-level road crack detection in black-box images. Computer-Aided Civil and Infrastructure Engineering, 34(8), 713-727.

“Cha, Y. J., Choi, W., & Büyüköztürk, O. (2017). Deep learningbased crack damage detection using convolutional neural networks. Computer-Aided Civil and Infrastructure Engineering, 32(5), 361-378.”

Chen, S., Saeed, T., Alqadhi, S. D., & Labi, S. (2019). Safety impacts of pavement surface roughness at two-lane and multi-lane highways: Accounting for heterogeneity and seemingly unrelated correlation across crash severities. Transportmetrica A: transport Science, 15(1), 18-33.

“Dietterich, T. (1995). Overfitting and undercomputing in machine learning. ACM Computing Surveys, 27(3), 326-327.”

Douangphachanh, V., & Oneyama, H. (2014). A study on the use of smartphones under realistic settings to estimate road roughness condition. EURASIP Journal onWireless Communications and Networking, 2014(1), 114.

Driss, S. B., Soua, M., Kachouri, R., & Akil, M. (2017). A comparison study between MLP and convolutional neural network models for character recognition. In Real-Time Image and Video Processing 2017 (vol. 10223). International Society for Optics and Photonics, 1022306.

Fujino, Y., Kitagawa, K., Furukawa, T., & Ishii, H. (2005). Development of vehicle intelligentmonitoring system (VIMS). In Smart Structures and Materials 2005: Sensors and Smart Structures Technologies for Civil, Mechanical, and Aerospace Systems (vol. 5765, pp. 148-158). International Society for Optics and Photonics.

Gao, Y., & Mosalam, K. M. (2018). Deep transfer learning for imagebased structural damage recognition. Computer-Aided Civil and Infrastructure Engineering, 33(9), 748-768.

Gao, Y., Kong, B., & Mosalam, K. M. (2019). Deep leaf-bootstrapping generative adversarial network for structural image data augmentation. Computer-Aided Civil and Infrastructure Engineering, 34(9), 755-773.

González, A., O'brien, E. J., Li, Y. Y., & Cashell, K. (2008). The use of vehicle acceleration measurements to estimate road roughness. Vehicle System Dynamics, 46(6), 483-499.

Gopalakrishnan, K., Khaitan, S. K., Choudhary, A., & Agrawal, A. (2017). Deep convolutional neural networks with transfer learning for computer vision-based data-driven pavement distress detection. Construction and Building Materials, 157, 322-330.

Graves, A., Mohamed, A. R., & Hinton, G. (2013). Speech recognition with deep recurrent neural networks. IEEE International Conference on Acoustics, Speech and Signal Processing. IEEE, 6645-6649.

Hinton, G., Deng, L., Yu, D., Dahl, G., Mohamed, A. R., Jaitly, N., . . . Sainath, T. (2012). Deep neural networks for acoustic modeling in speech recognition. IEEE Signal Processing Magazine, 29, 82-97.

Hoffmann, M., Mock, M.,&May, M. (2013). Road-quality classification and bump detectionwith bicycle-mounted smartphones. Proceedings of the 3rd International Conference on Ubiquitous DataMining (vol. 1088, pp. 39-43). CEUR-WS.org.

Huang, Y., Beck, J. L., & Li, H. (2019). Multitask sparse Bayesian learning with applications in structural health monitoring. Computer-Aided Civil and Infrastructure Engineering, 34(9), 732-754.

Hugo, D., Heyns, P. S., Thompson, R. J., & Visser, A. T. (2008). Haul road defect identification using measured truck response. Journal of Terramechanics, 45(3), 79-88.

Ioffe, S., & Szegedy, C. (2015). Batch normalization: Accelerating deep network training by reducing internal covariate shift. arXiv preprint arXiv:1502.03167.

Islam, S., Buttlar, W. G., Aldunate, R. G., & Vavrik, W. R. (2014). Measurement of pavement roughness using android-based smartphone application. Transportation Research Record, 2457(1), 30-38.

Koziarski, M., & Cyganek, B. (2017). Image recognition with deep neural networks in presence of noise—Dealing with and taking advantage of distortions. Integrated Computer-Aided Engineering, 24(4), 337-349.

Krizhevsky, A., Sutskever, I., & Hinton, G. E. (2012). ImageNet classification with deep convolutional neural networks. Advances in Neural Information Processing Systems, 1097-1105.

(56) References Cited

OTHER PUBLICATIONS

Lawrence, S., Giles, C. L., Tsoi, A. C.,&Back, A. D. (1997). Face recognition: A convolutional neural-network approach. IEEE Transactions on Neural Networks, 8(1), 98-113.
LeCun, Y., & Bengio, Y. (1995). Convolutional networks for images, speech, and time series. In M. A. Arbib (Ed.), The handbook of brain theory and neural networks (vol. 3361, No. 10, pp. 255-258). Cambridge, MA: MIT Press.
LeCun, Y., Bengio, Y., & Hinton, G. (2015). Deep learning. Nature, 521(7553), 436.
Li, S., Zhao, X.,&Zhou, G. (2019). Automatic pixel-levelmultiple damage detection of concrete structure using fully convolutional network. Computer-Aided Civil and Infrastructure Engineering, 34(7), 616-634.
Lin, M., Chen, Q., & Yan, S. (2013). Network in network. arXiv preprint arXiv:1312.4400.
Ma, X., Dai, Z., He, Z., Ma, J., Wang, Y., & Wang, Y. (2017). Learning traffic as images: A deep convolutional neural network for large-scale transportation network speed prediction. Sensors, 17(4), 818.
Maas, A. L., Hannun, A. Y., & Ng, A. Y. (2013). Rectifier nonlinearities improve neural network acoustic models. Proc. ICML, vol. 30, No. 1, p. 3.
Maeda, H., Sekimoto, Y., Seto, T., Kashiyama, T., & Omata, H. (2018). Road damage detection and classification using deep neural networks with smartphone images. Computer-Aided Civil and Infrastructure Engineering, 33(12), 1127-1141.
Maeda, K., Takahashi, S., Ogawa, T., & Haseyama, M. (2019). Convolutional sparse coding-based deep random vector functional link network for distress classification of road structures. Computer-Aided Civil and Infrastructure Engineering, 34(8), 654-676.
Molina-Cabello, M. A., Luque-Baena, R. M., López-Rubio, E., & Thurnhofer-Hemsi, K. (2018). Vehicle type detection by ensembles of convolutional neural networks operating on super resolved images. Integrated Computer-Aided Engineering, 25(4), 321-333.
T. Nagayama, A. Miyajima, S. Kimura, Y. Shimada, and Y. Fujino, "Road condition evaluation using the vibration response of ordinary vehicles and synchronously recorded movies," in spiedigitallibrary.org, 2013, p. 86923A.
Ngwangwa, H. M., Heyns, P. S., Breytenbach, H. G. A., & Els, P. S. (2014). Reconstruction of road defects and road roughness classification using artificial neural networks simulation and vehicle dynamic responses: Application to experimental data. Journal of Terramechanics, 53, 1-18.
Ngwangwa, H. M., Heyns, P. S., Labuschagne, F. J. J., & Kululanga, G. K. (2010). Reconstruction of road defects and road roughness classification using vehicle responses with artificial neural networks simulation. Journal of Terramechanics, 47(2), 97-111.
Ni, F., Zhang, J., & Chen, Z. (2019). Zernike-moment measurement of thin-crack width in images enabled by dual-scale deep learning. Computer-Aided Civil and Infrastructure Engineering, 34(5), 367-384.
Nitsche, P., Stütz, R., Kammer, M., & Maurer, P. (2012). Comparison of machine learning methods for evaluating pavement roughness based on vehicle response. Journal of Computing in Civil Engineering, 28(4), 04014015.
Niu, X. X., & Suen, C. Y. (2012). A novel hybrid CNN-SVM classifier for recognizing handwritten digits. Pattern Recognition, 45(4), 1318-1325.
Qian, Y., &Woodland, P. C. (2016). Very deep convolutional neural networks for robust speech recognition. IEEE Spoken Language Technology Workshop (SLT) (pp. 481-488). IEEE. Qin, Y., Dong, M., Zhao, F., Langari, R., & Gu, L.
Qin, Y., Dong, M., Zhao, F., Langari, R., & Gu, L. (2015). Road profile classification for vehicle semi-active suspension system based on adaptive neuro-fuzzy inference system. 54th IEEE Conference on Decision and Control (CDC) (pp. 1533-1538). IEEE.
Rafiei,M. H., & Adeli, H. (2017). A novel machine learning-based algorithm to detect damage in high-rise building structures. Structural Design of Tall and Special Buildings, 26(18), e1400.
Rafiei, M. H., Khushefati, W. H., Demirboga, R., & Adeli, H. (2017). Supervised deep restricted Boltzmann machine for estimation of concrete. ACI Materials Journal, 114(2), 237-244.
"Simonyan, K., & Zisserman, A. (2014). Very deep convolutional networks for large-scale image recognition. arXiv preprint arXiv:1409.1556."
Tong, Z., Gao, J., Sha, A., Hu, L., & Li, S. (2018). Convolutional neural network for asphalt pavement surface texture analysis. Computer-Aided Civil and Infrastructure Engineering, 33(12), 1056-1072.
Torres, J. F., Galicia, A., Troncoso, A., & Martinez-Álvarez, F. (2018). A scalable approach based on deep learning for big data time series forecasting. Integrated Computer-Aided Engineering, 25(4), 335-348.
Um, T. T., Babakeshizadeh,V.,&Kulić,D. (2017). Exercisemotion classification from large-scale wearable sensor data using convolutional neural networks. IEEE/RSJ International Conference on Intelligent Robots and Systems (IROS) (pp. 2385-2390). IEEE.
Wang, P., & Bai, X. (2018). Regional parallel structure based CNN for thermal infrared face identification. Integrated Computer-Aided Engineering, 25(3), 247-260.
Wang, H., Nagayama, T., Zhao, B., & Su, D. (2017). Identification of moving vehicle parameters using bridge responses and estimated bridge pavement roughness. Engineering Structures, 153, 57-70.
Wu, R. T., Singla, A., Jahanshahi, M. R., Bertino, E., Ko, B. J., & Verma, D. (2019). Pruning deep convolutional neural networks for efficient edge computing in condition assessment of infrastructures. Computer-Aided Civil and Infrastructure Engineering, 34(9), 774-789.
Yang, X., Li, H., Yu, Y., Luo, X., Huang, T., & Yang, X. (2018). Automatic pixel-level crack detection and measurement using fully convolutional network. Computer-Aided Civil and Infrastructure Engineering, 33(12), 1090-1109.
Zhang, Y., Miyamori, Y., Mikami, S., & Saito, T. (2019). Vibrationbased structural state identification by a 1-dimensional convolutional neural network. Computer-Aided Civil and Infrastructure Engineering, 34(9), 822-839.
Zhang, Z., Sun, C., Bridgelall, R., & Sun, M. (2018). Application of a machine learning method to evaluate road roughness from connected vehicles. Journal of Transportation Engineering, Part B: Pavements, 144(4), 04018043.
Zhao, B., Nagayama, T., Toyoda, M., Makihata, N., Takahashi, M., & Ieiri, M. (2017). Vehicle model calibration in the frequency domain and its application to large-scale IRI estimation. Journal of Disaster Research, 12(3), 446-455.
Roadroid Product. https://www.roadroid.com/map. Retrieved Mar. 20, 2024.
TotalPave Product. https://totalpave.com/. Retrieved Mar. 20, 2024.
RoadBotics Product. https://www.roadbotics.com/. Retrieved Mar. 20, 2024.
Carbin Product. https://fixmyroad.carbin.ai/. Retrieved Mar. 20, 2024.

* cited by examiner

| Layer | Input (W, H, D) | Output (W, H, D) | Feature map (depth) | Kernel (filter size) | Stride | Zero-padding | Activation | Batch normalization |
|---|---|---|---|---|---|---|---|---|
| Input | 150, 3, 1 | -- | -- | -- | -- | -- | -- | -- |
| Conv. | 150, 3, 1 | 150, 3, 32 | 32 | 5, 3 | 1, 1 | Same | Leaky-Relu | True |
| Conv. | 150, 3, 32 | 150, 3, 64 | 64 | 5, 3 | 1, 1 | Same | Leaky-Relu | True |
| GAP | 150, 3, 64 | 1, 1, 64 | -- | -- | -- | -- | -- | -- |
| Output | 1, 1, 64 | 1 | -- | -- | -- | -- | -- | -- |
FIG. 4
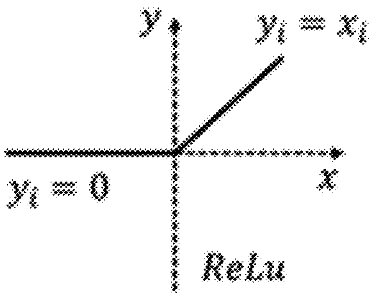
FIG. 5A
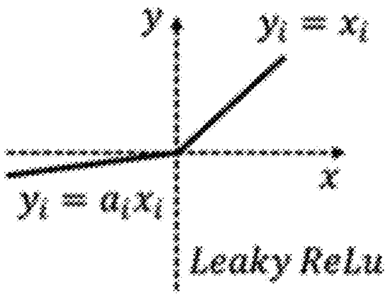
FIG. 5B
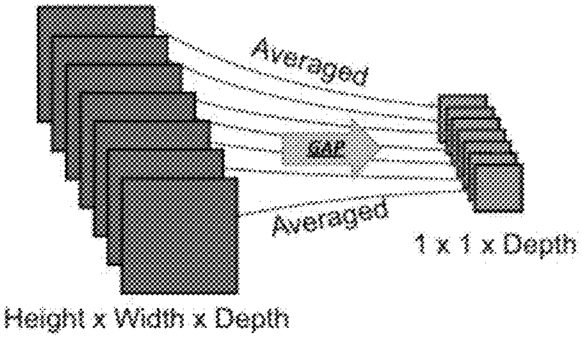
FIG. 6

CONVOLUTIONAL NEURAL NETWORKS FOR PAVEMENT ROUGHNESS ASSESSMENT USING CALIBRATION-FREE VEHICLE DYNAMICS

CROSS-REFERENCES TO RELATED APPLICATIONS

This application claims benefit of U.S. Provisional Application No. 63/175,369 filed Apr. 15, 2021, the specification of which is incorporated herein in its entirety by reference.

FIELD OF THE INVENTION

The present invention is directed to a method of identifying road roughness by collecting sensor data from a computing device and applying deep learning techniques to estimate the road's roughness index.

BACKGROUND OF THE INVENTION

Pavements are frequently subjected to heavy and fast-moving vehicle loads as well as present in harsh environments, thus, pavements are prone to damage (e.g., potholes, cracks, erosion, etc.) and accelerating deterioration. Rough road surfaces impact the ride comfort, vehicle speed, damages to vehicles, tire wear, increased maintenance costs of vehicles and road surfaces, and the number of injury and no-injury crashes on multilane highways (Islam, Buttlar, Aldunate, & Vavrik, 2014). Thus, prompt and accurate assessment of deteriorating road surface conditions is an essential task for the Department of Transportation (DOT) to operate the road network properly with increased service life and traffic safety (Chen, Saeed, Alqadhi, & Labi, 2019; Chen, Saeed, & Labi, 2017; Islam et al., 2014).

A one-dimensional longitudinal road profile index, called International Roughness Index (IRI), is widely used to measure road roughness (Douangphachanh & Oneyama, 2014; Fujino, Kitagawa, Furukawa, & Ishii, 2005; González, O'brien, Li, & Cashell, 2008; Nagayama, Miyajima, Kimura, Shimada, & Fujino, 2013; Zhao et al., 2017). Road roughness indices are typically assessed by road profile measurement using high-precision laser profilers and various dynamic sensors in combination with a quarter-car vehicle simulation. While such inertial profiler-based methods provide accurate IRI information and are becoming more affordable and widely used, if a more ubiquitous way of IRI assessment is available, it can provide more timely information about entire road conditions and help some local agencies that may have limited access to the inertial profilers. For example, in the United States, the IRI is typically collected on a yearly basis on the highway systems and on a 2-year basis for the non-highway networks using the inertial profilers (HPMS, 2014). The IRI is usually obtained for one of the curb lanes, not entire lanes, in urban or major road networks. Such yearly-based inspections and limited coverage may not effectively reflect the overall health conditions of our extensive road networks in a timely manner.

Several recent works have proposed to compensate for these limitations by using regular passenger vehicles and their dynamic response measurements (Fujino et al., 2005; Hugo, Heyns, Thompson, & Visser, 2008; Ngwangwa, Heyns, Breytenbach, & Els, 2014; Nitsche, Stütz, Kammer, & Maurer, 2012). The road roughness-induced vehicle dynamics were measured using a set of quality data acquisition systems (i.e., accelerometers, data logger, and PC). The accelerometers are placed near the axles to minimize unnecessary vehicle dynamics. Unfortunately, this method of sensor installation often requires vehicle modification to ensure the firm and reliable mounting of the sensors. These requirements still limit the widespread use in the majority of vehicles.

Other recent works have used smartphones as all-in-one devices for vehicle dynamics measurement, data processing, and communication in real-time (Buttlar & Islam, 2014; Douangphachanh & Oneyama, 2013, 2014; Islam et al., 2014; Nagayama et al., 2013). The use of smartphones has several advantages over previous data acquisition systems, which include an easy-to-mount capability without any vehicle modification, various kinds of embedded sensors available, high-performance processors, and wireless data communication ability (Islam et al., 2014). H. Wang, Nagayama, Zhao, and Su (2017) reported that the use of angular velocity data measured by gyroscopes in combination with a half-car model can be more robust than the use of vertical acceleration of the vehicle responses. While the acceleration measurements are affected by the location of the smartphone in the vehicle, the angular velocity responses are independent of the sensor location. However, these IRI estimation approaches that use vehicle dynamics, no matter which sensors are used, intrinsically require a precise calibration of the vehicle model. This is typically done with known road profiles or bump-induced vehicle responses at controlled vehicle speeds.

There have been many approaches to calibrating the passenger vehicles for the accurate IRI estimation from vehicle dynamic measurements. Various kinds of filters and optimization techniques have been used for the dynamic parameter calibration of numerical vehicle models, which include the Kalman filter, genetic algorithm, and particle filter methods (Nagayama et al., 2013; H. Wang et al., 2017). On the other hand, machine learning-based methods that do not require a mathematical vehicle model, so-called non-parametric approaches, also have been studied.

For example, a naïve Bayes-based road roughness classification algorithm has been investigated using the bicycle-mounted smartphone sensor data (Hoffmann, Mock, & May, 2013). A probabilistic neural network (PNN)-based road roughness classifier has been proposed (Qin, Dong, Zhao, Langari, & Gu, 2015). Bayesian-regularized nonlinear autoregressive exogenous model (NARX) was proposed to classify road damage using the reconstructed road profile without vehicle system characterization (Ngwangwa, Heyns, Labuschagne, & Kululanga, 2010). The performances of various machine learning algorithms for road roughness estimation, including multilayer perceptrons (MLP), random forests (RF), and support vector machines (SVMs) have been compared to estimate road roughness using a vehicle vibration measurement (Nitsche et al., 2012). However, no matter the calibration method, such a way of existing IRI estimations require precisely calibrated vehicle models, which is not practically applicable for usual passenger vehicles. For example, the number and locations of passengers in the vehicle may change every day, the vehicle speeds vary all the time, and suspension characteristics change by aging over time. Furthermore, the dynamic properties of vehicle mechanics may also change over time. The location, direction, and way of smartphone mounting may also be different every time. These ambient variations are closely related to the vehicle dynamics (i.e., vehicle mass, damping, pitch inertia, etc.) and corresponding sensor measurements change significantly. Therefore, previous calibrations of the vehicle model become quickly invalid for the IRI estimation under altered vehicle dynamics and sensor installations. A feature extraction technique has been proposed to identify common features (i.e., road roughness-related response) from the dynamic responses of multiple connected vehicles in combination with the artificial neural network (ANN) to estimate road roughness categories (Z. Zhang, Sun, Bridgelall, & Sun, 2018). Even though the features are related to the road roughness and independent of the vehicle's dynamic properties, the method has practical limitations that require multiple connected vehicles and vehicle response data near axles.

Recently, deep learning has shown great promise in many applications. Particularly, the convolutional neural network (CNN) showed great success over image classification domains (Lawrence, Giles, Tsoi, & Back, 1997; Ma et al., 2017; Simonyan & Zisserman, 2014). The CNN has significant performance improvements compared to classical machine learning approaches and systemized deterministic approaches (Driss, Soua, Kachouri, & Akil, 2017; Niu & Suen, 2012).

CNN was originally designed for 2D image data classification (LeCun & Bengio, 1985). But it also showed great accuracy in many other applications such as motion classification (Um, Babakeshizadeh, & Kulić, 2017), traffic information processing (Ma et al., 2017), image denoising (Koziarski & Cyganek, 2017), speech recognition (Abdel-Hamid et al., 2014; Graves, Mohamed, & Hinton, 2013; Hinton et al., 2012), infrared-based face identification (P. Wang & Bai, 2018), and time-series forecasting (Torres, Galicia, Troncoso, & Martínez-Alvarez, 2018). In contrast to classical machine learning approaches that require handcrafted data preprocessing with swallow networks, CNNs use end-to-end deep learning (ETEDL) by direct use of raw data into the input layer with deep networks to take full advantage of the deep learning method. The key benefit of CNN is the capability that can extract high-level features with a pooling layer. Typical ETEDL uses the CNN architecture as a high-level feature extractor and attaches fully connected (FC) layers to perform the prediction tasks.

In the civil-infrastructural engineering area, neural network-based methods have been widely applied by taking advantage of robust performance when working with real-world data (Adeli, 2001; Adeli & Hung, 1994). At present, deep learning methods are popularly applied for various applications. For example, damage identification on structures with images (Cha, Choi, & Büyüköztürk, 2017; Gao, Kong, & Mosalam, 2019; Gao & Mosalam, 2018; Li, Zhao, & Zhou, 2019; Ni, Zhang, & Chen, 2019; Wu et al., 2019; Yang et al., 2018), with sensor measurements (Huang, Beck, & Li, 2019; Rafici & Adeli, 2017; Y. Zhang, Miyamori, Mikami, & Saito, 2019), concrete property estimation (Rafiei, Khushefati, Demirboga, & Adeli, 2017), and vehicle type detection in real traffic data (Molina-Cabello, Luque-Baena, López-Rubio, & Thurnhofer-Hemsi, 2018). For pavement health assessments, several image-based methods (Bang, Park, Kim, & Kim, 2019; Gopalakrishnan, Khaitan, Choudhary, & Agrawal, 2017; H. Maeda, Sekimoto, Seto, Kashiyama, & Omata, 2018; K. Maeda, Takahashi, Ogawa, & Haseyama, 2019; Tong, Gao, Sha, Hu, & Li, 2018; A. Zhang et al., 2019) and vehicle noise measurement (Ambrosini, Gabrielli, Vesperini, Squartini, & Cattani, 2018) have been studied. However, the vehicle vibration-based road roughness estimation using deep learning-based approaches has not been proposed yet.

This study develops a CNN-based road roughness (i.e., discrete IRI) estimation method that utilizes anonymous passenger vehicles and their dynamic responses to compensate for the drawbacks of current profiling-based technologies. The CNN extracts dominant road roughness features from uncalibrated vehicles. The novelty of this method is that it presents an end-to-end CNN that is independent of the vehicle's mechanical properties and driving speeds. Among others, particularly, the CNN is employed for this study rather than a recurrent neural network (RNN), one of the most well-known methods for sequential time-series data applications, because the vehicle dynamic responses to the road roughness per each segment do not rely on the former segment road roughness. The raw data from the vehicle dynamics from smartphones are used without preprocessing to train CNN and estimate the IRI of a road. A half-car model is selected for vehicle simulation in this study. The half-car model is composed of a main body and a single side of the front and rear axle/wheel systems, which is a simple but effective model that can account for the bouncing and pitching motion, various axle types, and various measurement locations along the longitudinal direction. The training and test data are generated by 4-DOF half-car simulation in the form of multimetric vehicle responses (i.e., vertical acceleration and angular velocity) and various vehicle types and driving speeds are used for the network training. The performance of the proposed method is validated through comprehensive numerical simulations using real IRI data and real driving speed profiles obtained in a road section in Tucson, Arizona.

BRIEF SUMMARY OF THE INVENTION

It is an objective of the present invention to provide systems and methods that allow for estimating road roughness under real-world driving conditions through training and implementation of a convolutional neural network (CNN), as specified in the independent claims. Embodiments of the invention are given in the dependent claims. Embodiments of the present invention can be freely combined with each other if they are not mutually exclusive.

The present invention features a system for estimating road roughness under real-world driving conditions through training and implementation of a convolutional neural network (CNN). In some embodiments, the system may comprise a plurality of computing devices (100) comprising a plurality of portable computing devices, a plurality of vehicle-embedded computing devices, or a combination thereof. Each computing device may be mounted to a vehicle. Each computing device may be capable of measuring, while the vehicle is driving on a road, GPS, driving speed, vertical acceleration, and angular velocity of pitch motion. The system may further comprise a neural network computing device communicatively coupled to the plurality of computing devices. The neural network computing device may comprise the CNN comprising a plurality of convolutional layers and a plurality of global average pooling layers. The CNN may be trained by a data set comprising previous data from the plurality of computing devices comprising the plurality of parameters. The CNN may be capable of accepting the plurality of parameters from the plurality of computing devices as input and generating an international roughness index (IRI) value of the road as output based on the input.

The present invention features a method for estimating road roughness under real-world driving conditions through training and implementation of a convolutional neural network (CNN). The method may comprise mounting a computing device to a vehicle. The method may further comprise measuring, by the computing device, while the vehicle is driving on a road, GPS, driving speed, vertical acceleration, and angular velocity of pitch motion. The method may further comprise transmitting the plurality of parameters as input to a neural network computing device communicatively coupled to the computing device. The neural network computing device may comprise the CNN, the CNN comprising a plurality of convolutional layers and a plurality of global average pooling layers. The CNN may be trained by a data set comprising previous data from a plurality of computing devices comprising the plurality of parameters. The method may further comprise processing, by the CNN, of the input from the computing device (110) to generate an IRI value of the road as output.

One of the unique and inventive technical features of the present invention is the measurement of GPS, driving speed, vertical acceleration, and angular velocity of pitch motion for training and utilizing a specialized CNN. Without wishing to limit the invention to any theory or mechanism, it is believed that the technical feature of the present invention advantageously provides for efficient and accurate estimation of IRI values of a road regardless of the computing device, mounting device, or car model used. None of the presently known prior references or work has the unique inventive technical feature of the present invention.

Furthermore, the inventive feature of the presently claimed invention is counterintuitive. The reason that it is counterintuitive is because it contributed to a surprising result. One skilled in the art would implement a calibration procedure to link a phone and a vehicle for accurate IRI estimation due to the different mechanical characteristics of every vehicle. Surprisingly, the present invention is able to accurately estimate IRI for any vehicle without calibration through use of a trained CNN and data processing method. Thus, the presently claimed invention contributed to a surprising result and is counterintuitive.

Any feature or combination of features described herein is included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 4 shows a table showing an example of a convolutional neural network architecture with two CNN layers.

FIG. 5A shows a graph of a ReLu activation function.

FIG. 5B shows a graph of a Leaky ReLu activation function.

FIG. 6 shows a diagram of an example of a Global Average Pooling (GAP) layer as implemented in the presently claimed invention.

DETAILED DESCRIPTION OF THE INVENTION

Figure 3:
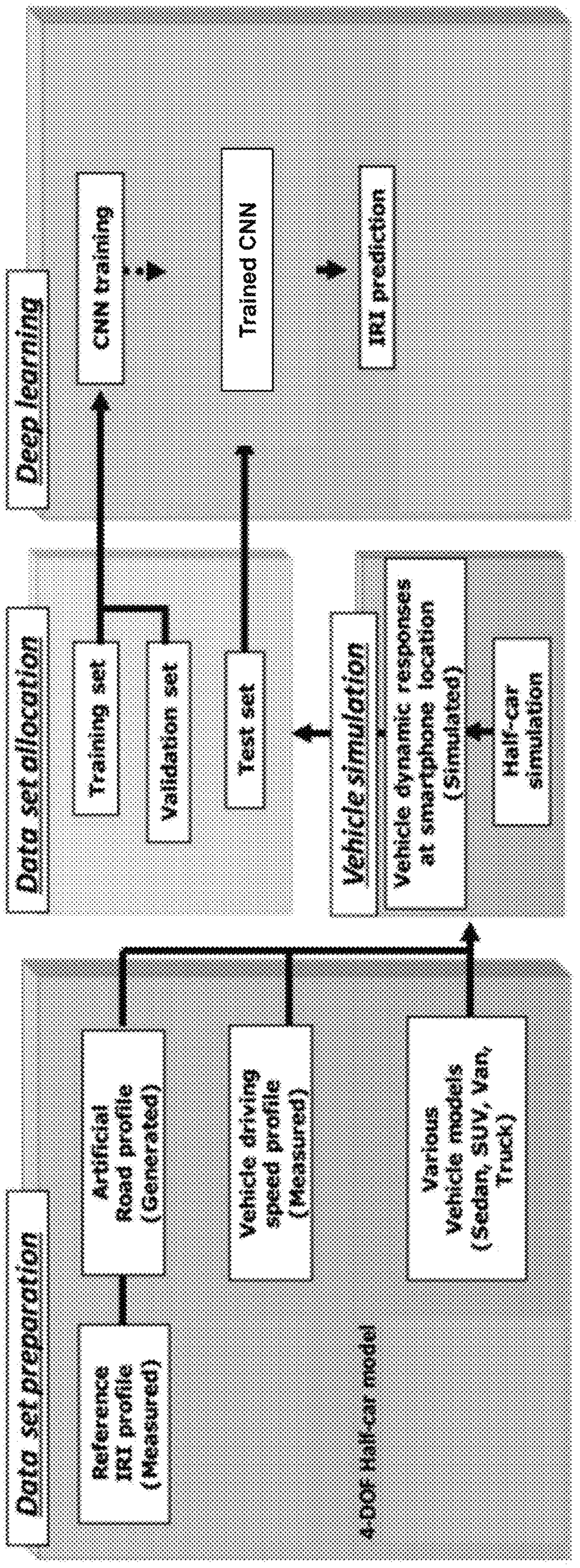
FIG. 3 shows a diagram of the overall framework of the proposed method.

FIG. 3A shows the CNN architecture for IRI estimation which consists of input, CNN, and Global Average Pooling (GAP) layer. The input layer is a single channel image that is converted from simulated vehicle dynamics (i.e., sensor data) Fi. Two stacked convolutional layers are used as a baseline structure. The effects of additional CNN layers have been further investigated to determine the best CNN depth. During the convolutional operations, the spatial map sizes had to be maintained to keep all the available features. Zero padding was used to maintain the feature map size and batch normalization was used between each convolutional layer to accelerate the training step and avoid overfitting. The pooling layer commonly used after the convolutional layer to subsample the feature map was not used in this study to preserve the maximum available information. After convolutional layers, GAP layers were used for the task of IRI regression. The detailed dimensional setup of each layer is described in Table 1 and the following sections describe further details.

The CNNs have shown excellent performance in many image classification tasks (Cha et al., 2017; Krizhevsky, Sutskever, & Hinton, 2012; Simonyan & Zisserman, 2014). The CNN learns the key features of the image with the convolutional layer. The convolutional layer plays a role as a filter that has learnable weights. The filter has a smaller size (i.e., smaller W & H) but the same depth (D) as the input image. It creates a spatial feature map layer by layer by sweeping the image. If the sensor data are arranged on the border of the image, the included information would be quickly washed away after a few convolutional operations, which hinders the construction of a deep CNN architecture (Qian & Woodland, 2016). In this study, the zero-padding method is used to preserve the spatial size as well as inherent information at the border of the image. FIG. 4 shows the dimensions of the baseline CNN structure used in this study.

Overfitting occurs when the trained neural network fits too well. Specifically, it occurs when the network fits in the noise data by memorizing the peculiarities of data features rather than learning the general features of data (Dietterich, 1995). An overfitted model has low bias and high variance and lacks generalization on a new data set, which leads to inaccurate predictions. Batch normalization helps reduce the potential of the model to overfit by normalizing the input range of activation function, which allows for fast learning and regularization effect (Ioffe & Szegedy, 2015). We use batch normalization between every CNN layer.

A rectified linear unit (ReLu) was used as an activation function for this study with high accuracy and efficiency in many applications (LeCun, Bengio, & Hinton, 2015). The ReLu consists of two functions that are zero on the negative side and y=x on the right side as shown in FIG. 5A. It allows the gradient to stay alive by preventing gradient saturation and provides better computation with linear operation. However, due to the zero region on the left side which causes dead neurons from the zero region of activation preventing weight updating, Leaky ReLu was proposed by adding a small slope in the negative side to keep the gradient alive (Maas, Hannun, & Ng, 2013) as shown in FIG. 5B. This study used Leaky Relu with a negative side slope of 0.3 for all activation functions.

There are two commonly used types of neural network layers: CNN and FC layers. The CNN layers are used for high-level feature extraction and FC layers are used for classification or regression tasks. However, the FC layers are prone to have overfitting as an issue since they have several neurons with full connections. The GAP layer illustrated in FIG. 6 resolves this concern of the overfitting problem by averaging each spatial map along with the depth in the last convolutional layer. The GAP layer also allows us to feed spatial features into the output layer directly for the classification or regression tasks. It has several advantages over FC in CNN architecture that it reduces the chances of overfitting by not using fully connected parameters to train. Furthermore, it is more native to convolution structure by directly taking averaged convolution features to output (Lin, Chen, & Yan, 2013).

Figure 1:
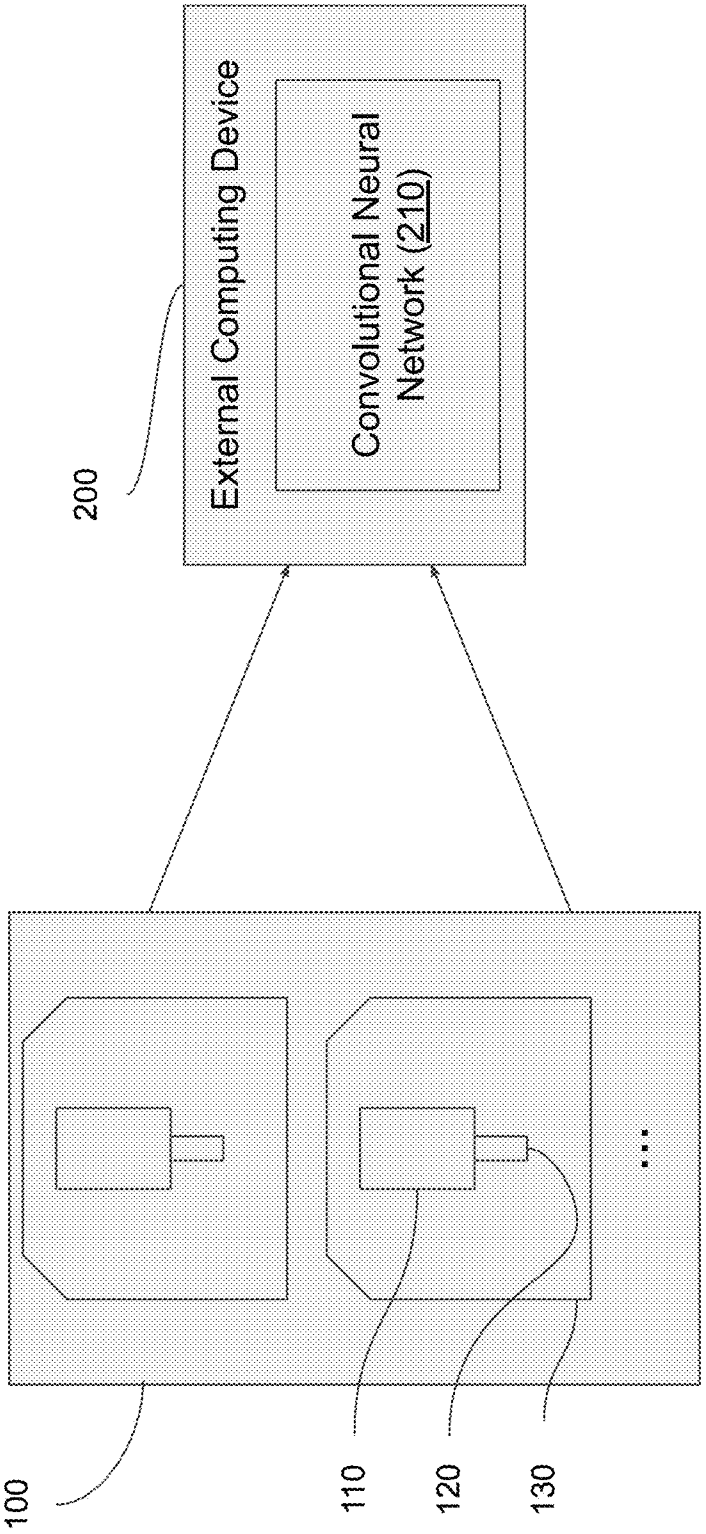
FIG. 1 shows a schematic of a system of the present invention for estimating road roughness under real-world driving conditions through training and implementation of a convolutional neural network (CNN).

Referring now to FIG. 1, the present invention features a system for estimating road roughness under real-world driving conditions through training and implementation of a convolutional neural network (CNN) (210). In some embodiments, the system may comprise a plurality of computing devices (100) comprising a plurality of portable computing devices, a plurality of vehicle-embedded computing devices, or a combination thereof. Each computing device (110) may be mounted to a vehicle (130). Each computing device (110) may be capable of measuring, while the vehicle (130) is driving on a road, a plurality of parameters. The plurality of parameters may comprise GPS, driving speed, vertical acceleration, and angular velocity of pitch motion. The system may further comprise a neural network computing device (200) communicatively coupled to the plurality of computing devices (100). In some embodiments, the neural network computing device (200) may comprise a desktop computer, a laptop, a smart device, a cloud server, or any device comprising a memory component comprising computer-executable instructions and a processor capable of executing the said computer-executable instructions. The neural network computing device (200) may comprise the CNN (210), the CNN (210) comprising a plurality of convolutional layers, and a plurality of global average pooling layers. The CNN (210) may be trained by a data set comprising previous data from the plurality of computing devices (100) comprising the plurality of parameters. The CNN (210) may be capable of accepting the plurality of parameters from the plurality of computing devices (100) as input and generating an international roughness index (IRI) value of the road as output based on the input.

In some embodiments, the plurality of convolutional layers comprises 7 convolutional layers. Each convolutional layer may be zero-padded to maintain spatial features, batch normalized to accelerate training speed and prevent overfitting, and have leaky-relu activation for non-linear operations. In some embodiments, each computing device (110) of the plurality of computing devices (100) may be mounted to the vehicle (130) by a mounting device (120) selected from a group comprising a vent clip, a vent magnet, a section clip, a suction magnet, and a CDP clip. In some embodiments, the plurality of computing devices (100) may be capable of measuring GPS at 1 Hz. In some embodiments, the plurality of computing devices (100) may be capable of measuring GPS at 0.5 to 2 Hz. In some embodiments, the plurality of computing devices (100) may be capable of measuring GPS at 2 Hz at most. In some embodiments, measuring GPS may comprise GPS resolution enhancement by interpolation and grid snapping. In some embodiments, the plurality of computing devices (100) may be capable of measuring vertical acceleration and angular velocity at about 100 Hz. In some embodiments, the plurality of computing devices (100) may be capable of measuring vertical acceleration and angular velocity at 50 to 150 Hz. In some embodiments, the plurality of computing devices (100) may be capable of measuring vertical acceleration and angular velocity at 100 Hz at most. In some embodiments, each parameter of the plurality of parameters may be converted into a fixed-size image array before being used as input to the CNN (210). The system may be capable of measuring IRI once about every 8 m. A batch size of the CNN (210) may be 64 and a learning rate of the CNN (210) may be 0.0001.

Figure 2:
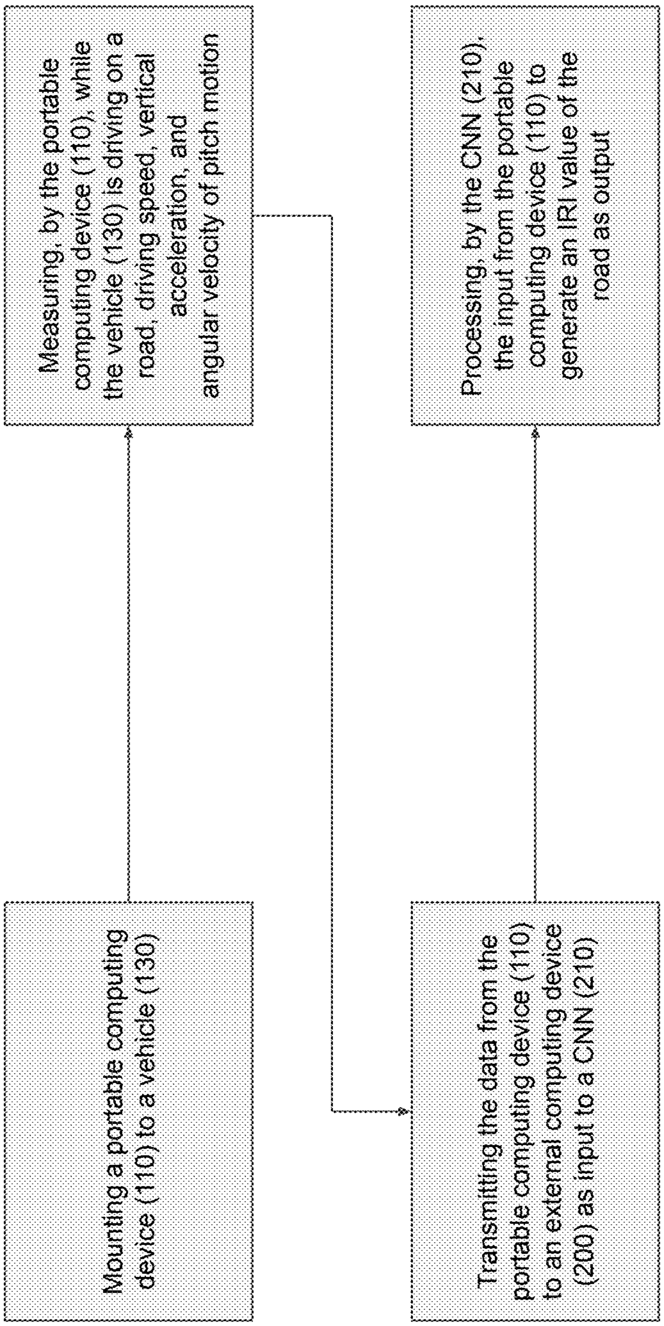
FIG. 2 shows a flow chart of a method of the present invention for estimating road roughness under real-world driving conditions through training and implementation of a convolutional neural network (CNN).

Referring now to FIG. 2, the present invention features a method for estimating road roughness under real-world driving conditions through training and implementation of a convolutional neural network (CNN) (210). The method may comprise mounting a computing device (110) to a vehicle (130). The computing device (110) may be a portable computing device, a vehicle-embedded computing device, or a combination thereof. The method may further comprise measuring, by the computing device (110), while the vehicle (130) is driving on a road, a plurality of parameters. The plurality of parameters may comprise GPS, driving speed, vertical acceleration, and angular velocity of pitch motion. The method may further comprise transmitting the plurality of parameters as input to a neural network computing device (200) communicatively coupled to the computing device (110). In some embodiments, the neural network computing device (200) may comprise a desktop computer, a laptop, a smart device, a cloud server, or any device comprising a memory component comprising computer-executable instructions and a processor capable of executing the said computer-executable instructions. The neural network computing device (200) may comprise the CNN (210), the CNN (210) comprising a plurality of convolutional layers, and a plurality of global average pooling layers. The CNN (210) may be trained by a data set comprising previous data from a plurality of computing devices (100) comprising the plurality of parameters. The method may further comprise processing, by the CNN (210), the input from the computing device (110) to generate an IRI value of the road as output. Processing the input from computing device (110) may comprising accepting, by the CNN (210), the input as a 2-dimensional array (an image shape). The input is then processed through the CNN (210) to produce an output in the form of an IRI output.

In some embodiments, the plurality of convolutional layers comprises 7 convolutional layers. Each convolutional layer may be zero-padded to maintain spatial features, batch normalized to accelerate training speed and prevent overfitting, and have leaky-relu activation for non-linear operations. In some embodiments, each computing device (110) of the plurality of computing devices (100) may be mounted to the vehicle (130) by a mounting device (120) selected from a group comprising a vent clip, a vent magnet, a section clip, a suction magnet, and a CDP clip. In some embodiments, the plurality of computing devices (100) may be capable of measuring GPS at 1 Hz. In some embodiments, the plurality of computing devices (100) may be capable of measuring GPS at 0.5 to 2 Hz. In some embodiments, the plurality of computing devices (100) may be capable of measuring GPS at 2 Hz at most. In some embodiments, measuring GPS may comprise GPS resolution enhancement by interpolation and grid snapping. In some embodiments, the plurality of computing devices (100) may be capable of measuring vertical acceleration and angular velocity at about 100 Hz. In some embodiments, the plurality of computing devices (100) may be capable of measuring vertical acceleration and angular velocity at 50 to 150 Hz. In some embodiments, the plurality of computing devices (100) may be capable of measuring vertical acceleration and angular velocity at 100 Hz at most. In some embodiments, each parameter of the plurality of parameters may be converted into a fixed-size image array before being used as input to the CNN (210). The system may be capable of measuring IRI once about every 8 m. A batch size of the CNN (210) may be 64 and a learning rate of the CNN (210) may be 0.0001.

EXAMPLE

The following is a non-limiting example of the present invention. It is to be understood that said example is not intended to limit the present invention in any way. Equivalents or substitutes are within the scope of the present invention.

Figure 7:
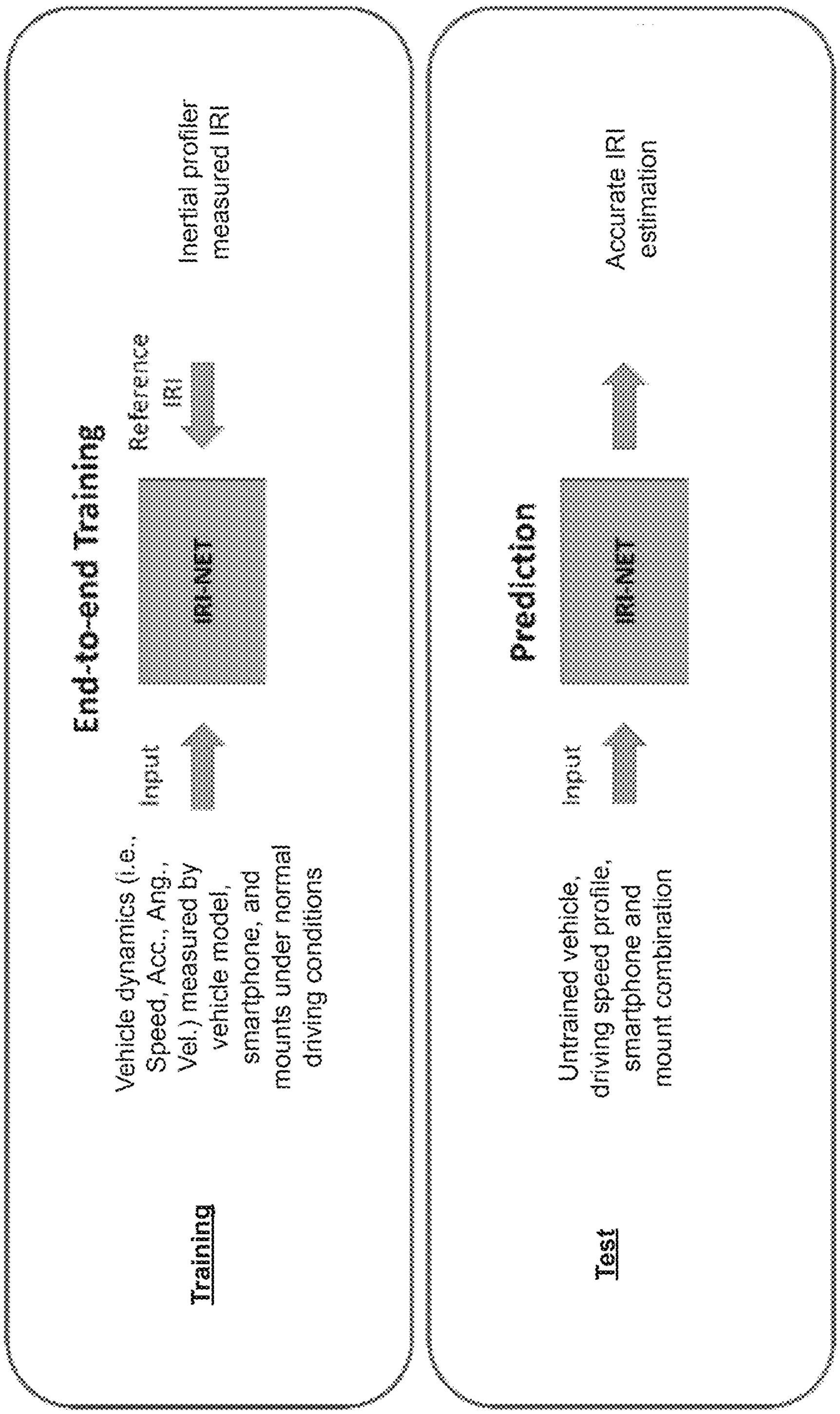
FIG. 7 shows a training and test framework of the CNN of the presently claimed invention.

This section describes the main strategy to train IRI-Net for direct IRI estimation under real-world conditions (i.e., randomized passenger vehicle, driving speed, driving speed, and mounts) without calibration. FIG. 7 shows the proposed framework of this study. Data was collected using various vehicle models, smartphones, and mounts under variable driving speeds. The collected data was divided into a training/validation/test set. The developed CNN was trained, and the performance of CNN was evaluated using an untrained dataset.

Figure 9A:
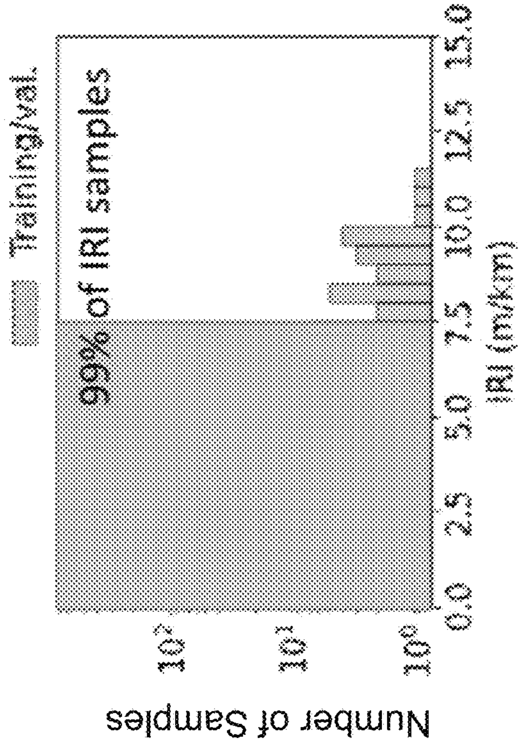
FIGS. 9A-9B show graphs of IRI data distribution of the training dataset and the test dataset, respectively.
Figure 9B:
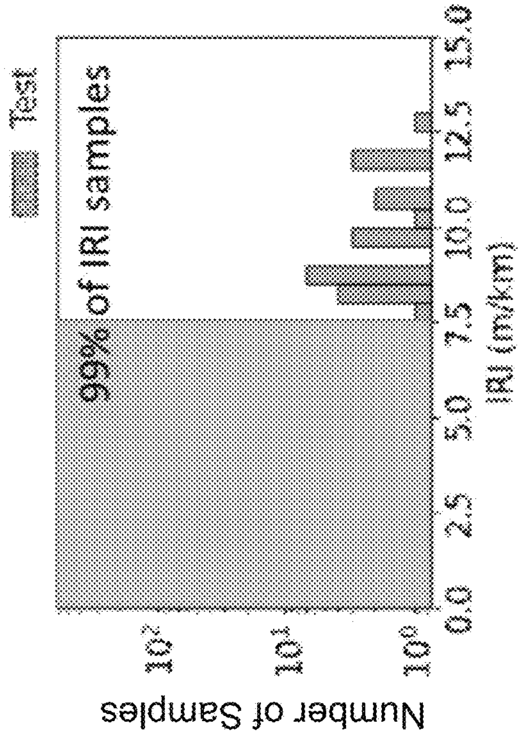

This section introduces the full detail of dataset collection. The Kolb Rd. in Tucson, AZ, was selected as the study roadway. The reference IRI data was provided by Tucson city. The IRI data was measured on December 2019, approximately eight months old from the data collection period. However, we assumed there was not much deterioration since the IRI degradation is not significant during a year. Both directions (i.e., Southbound and northbound) of the Kolb Rd. in Tucson were used as test roads, and each direction has an 18.2 km (11.3 miles) distance for each trip. The data distribution is shown in FIGS. 9A-9B. The majority of IRI values range from 0-7.5 m/km which consists of rural areas with relatively high IRI and urban areas with low IRI values. The pavement condition corresponding to IRI is classified as airport runway quality (~2 m/km), new pavement (1.5-3.5 m/km), older pavements (2.5-6.0 m/km), maintained unpaved road (3.5-10 m/km), and damaged pavements (4-11 m/km). There are not many severely damaged road sections on Kolb Rd. However, it has sufficient data for high quality and damaged conditions (i.e., airport runaway~damaged pavement). In this study, the IRI evaluation length was 8.05 m which is classified as localized IRI.

The dataset collection was designed to reflect realistic driving conditions. A total of 29 vehicles were recruited without overlap of model or generations. All drivers used various iPhone models (i.e., a total of nine models) and measured the vehicle dynamics using an iOS app. "Sensorlog". Drivers were guided to drive on the rightmost lane, which was the reference IRI evaluation target. The majority of cases were measured at different dates and times. The smartphone mount type affects the dynamics of measurement significantly. Therefore, five different mount types: vent clip, vent magnet, suction clip, suction magnet, and CD mount, were considered. The GPS, driving speed, vertical acceleration, and angular velocity of pitch motion from two round trips with different mounts were recorded from each vehicle case. The GPS was measured at 1 Hz and acceleration, and angular velocity was measured at 100 Hz. The driver-owned mount was used for the first trip (i.e., trip 1), and another type of mount was used for the second trip (i.e., trip 2) as possible. If the driver doesn't have a mount, two different types of mounts were provided.

In this study, raw sensor measurement was used without preprocessing in an end-to-end manner. The raw sensor measurement needs to be processed as a fixed-size image array for CNN input. However, each segment measurement has a different signal length due to different driving speeds. Therefore, the zero-padding method was applied within a fixed window size. The zero-padding method is a method to handle varying time-series signals for CNN input. The IRI was evaluated every 8.05 m using an integration of driving speed history, and low driving speed cases under 20 km/h were excluded. Because the quality of vehicle dynamic measurement is highly influenced by isolated traffic and calming devices when the driving speed is slow. For each IRI evaluation, 150 sample size was selected considering the maximum travel time of 8.05 m is 1.45 sec (i.e., 145 data points) when the driving speed was 20 km/h. Three sensor measurements, driving speed, gravity direction acceleration, and angular velocity were stacked vertically. Therefore, a 150×3 single-channel image was used for each IRI estimation. After the data processing, the total number of training/validation/test data sets was arranged as 56767/16031/38000. Vehicle models were not overlapped among the training/validation/test datasets. Southbound of Kolb Rd was used for training and validation and northbound was used for tests for accurate performance evaluation. For the test section, only 16 km length data was used for accurate comparison since each collected data has a slightly different starting & ending location. Three data combinations were compared to investigate the best data combination: (a) case-1: driving speed+acceleration (gravity direction)+angular velocity (pitch), (b) case-2: driving speed+acceleration, and (c) driving speed+angular velocity (pitch). The reduced input size (i.e., 150×2) was used for case2, and case 3.

Figure 8A:
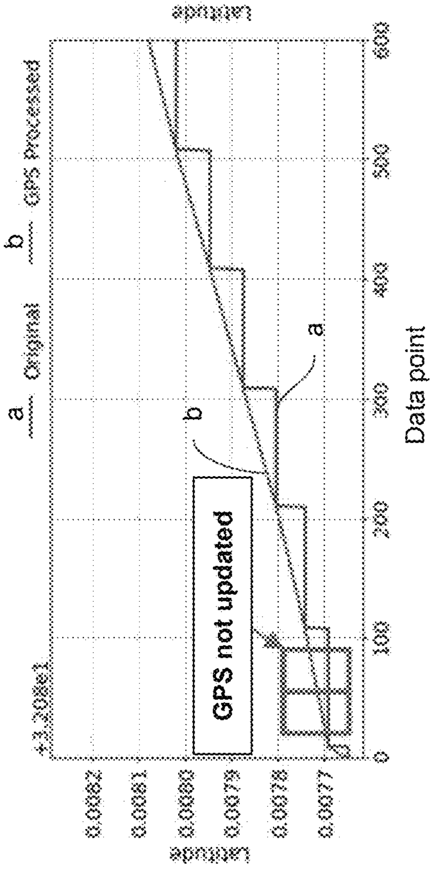
FIG. 8A shows the raw measurement of GPS from a smartphone.
Figure 8B:
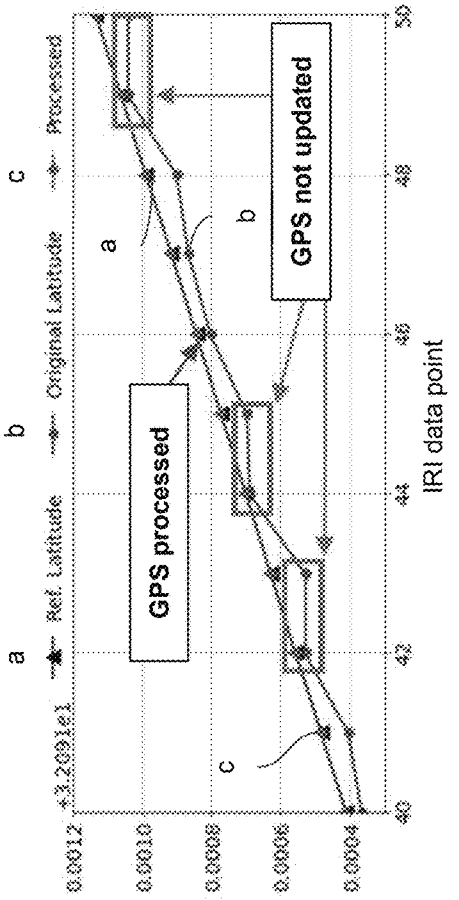
FIG. 8B shows the averaged GPS record per each IRI segment (i.e., 8.05 m).

The sampling rate of smartphone embedded GPS was 1 Hz which is not sufficient for accurate measurement localization when the evaluation interval is 8.05 m. When the driving speed exceeds 8.05 m/s (28.98 km/h), the IRI segment often changes within a second without position update. Moreover, crowdsourced data should be managed by a grid-based approach for statistical analysis of spatial patterns. The grid approach has been widely adopted in intelligent traffic system areas for efficient information management. Therefore, this study proposed a two-step GPS processing strategy: i) GPS resolution enhancement by interpolation, and ii) grid snapping. In this study, the latitude of the Kolb Rd was used as a predefined grid. FIG. 8A shows the raw measurement of GPS from a smartphone as a blue line. FIG. 8B shows the averaged GPS record per each IRI segment (i.e., 8.05 m). The green boxes show that GPS was not properly updated as raw GPS measurement was not updated. Therefore, the GPS coordinates were linearly interpolated for the finer GPS update shown in the red line in FIG. 8A. The interpolated GPS records were sliced every 8.05 m and averaged. Each processed GPS record per segment was snapped to the nearest grid. The red dash line in FIG. 8B shows the interpolated and snapped GPS record. The proposed processing method was able to align data into a predefined grid.

A new fully convolutional neural network architecture named IRI-Net was designed for IRI estimation. The proposed CNN consists of input, convolutional layer, batch normalization layer, and global average pooling layers. The single-channel image is converted from vehicle dynamics feed to a convolutional layer. Total seven of the convolutional layers were sequentially stacked. Each convolutional layer was zero-padded to maintain all spatial features and batch normalization was applied to accelerate training speed and prevent overfitting. Each layer has leaky-relu activation for non-linear operation. The global pooling average (GAP) layer was used for IRI regression as it has several advantages compared to the flattening layer combined with a fully-connected layer; reduces trainable parameters for fast training, and better robustness of spatial translations in the data, and is less prone to overfitting. The proposed network was coded using Python with the Keras library. The IRI-Net was trained on the Intel i7-6700, 32 GB RAM, NVIDIA 1080Ti (11 GB), Ubuntu 18.04 environment. The batch size was 64 and the learning rate was 0.0001. Adam optimizer and mean-squared error were used for the optimizer and loss function. The training was done after 300 epochs and the weight with the best validation accuracy was used for the test.

The performance of IRI-Net was validated on the northbound of Kolb Rd., untrained nine vehicles with two different mounts for each driving which were a total of 18 driving cases. Each case was measured by different drivers, smartphones, mounts, and variable driving speeds, which was the real-world condition. The four IRI estimation results show very close that the developed CNN was able to estimate IRI under real-world conditions independent of vehicle model, driving speed, smartphone, and mount. There was no IRI reference record at the 1.5 km section because the reference IRI vehicle speed was below 20 km/h. The RMSE of the individual case shows 1.17 m/km, which was not small but acceptable. Because there are several practical uncertainties among reference IRI and test vehicle measured IRIs that will be discussed in the next section.

The IRI is typically measured on the rightmost lane following the HPMS field manual. In this study, all the test vehicles were driven in the rightmost lane for accurate training and evaluation. However, all vehicles cannot drive on the same path which reflects different vehicle response characteristics. Moreover, the usual drivers tend to avoid local pavement damage such as potholes, and local side crack damages that cause underestimation of IRI. The high IRI value has some errors that clearly show a higher IRI trend for all vehicles. However, the second peak at 1.25 km shows a lower response, and Altima and Rx350 did not show high IRI values. Because the second peak region has localized pavement damage that drivers can easily avoid. The uncertainty from the inconsistent driving path also causes inaccurate training and validation results for CNN model development.

Figure 10:
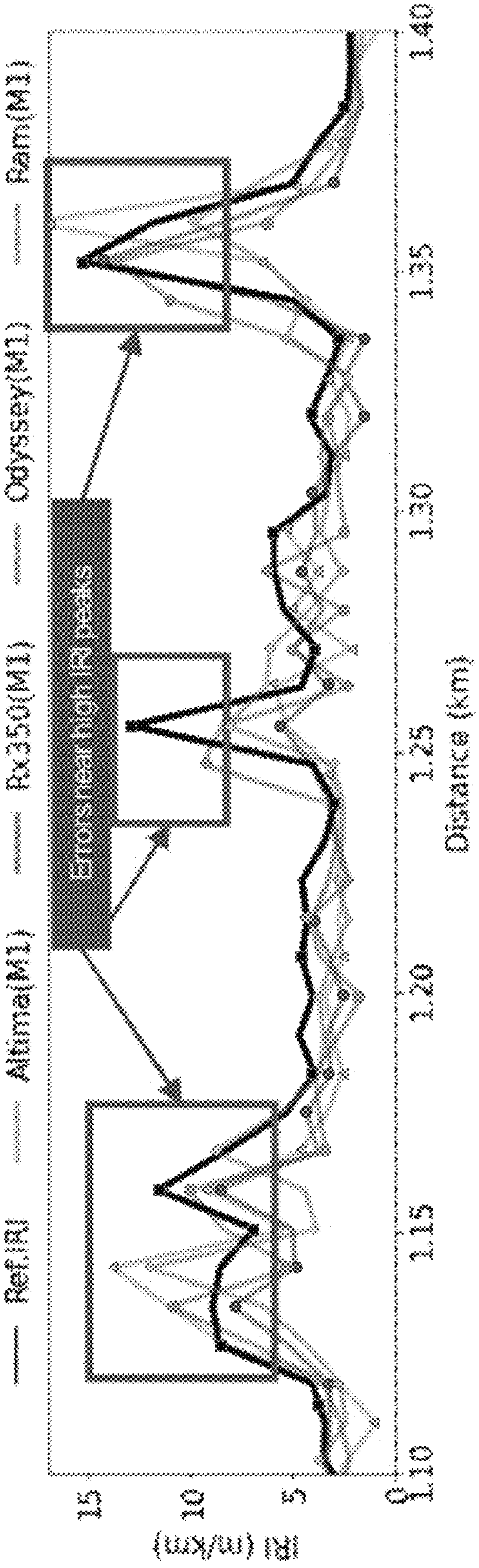
FIG. 10 shows a graph of IRI prediction results with high IRI peaks (representing errors) emphasized.

Modern smartphones are equipped with assisted GPS (A-GPS) that utilizes the GPS antenna with smartphone networks. Various sources influence GPS accuracy: associated GPS satellites, receiver-related errors, and errors associated with signal propagation. In practice, smartphone GPS accuracy ranges from 7~13 m. Considering the evaluation length of localized IRI as 8.05 m, the limited GPS accuracy is inevitable. Although the GPS resolution was enhanced and snapped to the grid, misalignment can occur in practice. FIG. 10 shows the detailed IRI evaluation results from four vehicles at the high-IRI peak region. Four IRI measurements from different types of vehicles show very close around 3 m/km region. However, significant errors were observed in high-IRI regions in red boxes in FIG. 10. The reference IRI shows a sharp peak at the 1.35 km region. However, the four measurement peaks were not exactly located because of limited GPS accuracy which affected the RMSE value. However, the overall trend well matched the smooth IRI region and high-IRI regions.

The imbalanced training dataset also causes the underestimation of IRI, particularly for the high-IRI cases. Approximately 99% of IRI values are distributed over a 0-7.5 m/km range. It affects an inaccurate evaluation of IRI for high IRI cases. The red error bar shows the prediction error of the test case with a standard deviation. The trend shows a clear correlation between data quantity versus accuracy. The errors of high IRI peaks are also shown in FIG. 10. The significant RMSE errors of the high-IRI region were caused by the imbalanced dataset and limited GPS accuracy.

This section discussed the influence of data quantity on IRI accuracy. The RMSE and 95% CI of different averaged data quantities were compared. The result shows that RMSE improved and converged to nearly 0.8 m/km after four-vehicle case averages, but CI improved as the case number increased. The RMSE improvement was only 0.4 and a small number of the vehicle or single vehicle was able to estimate IRI with reasonable accuracy. When two IRI measurements were averaged in case 1, some sharp peaks were not detected. However, as the average case increased to four in case 2, the estimated IRI followed the trend but in a smooth trend. Case 3 with all averaged cases shows an identical trend to case 2 but showed a narrower CI. The localized IRI, which has a short evaluation length (i.e., 8.05 m) significantly influenced by the driving path, particularly when the pavement damage is localized (i.e., pothole). Therefore, the averaged IRI trend showed a smoother trend than the reference IRI. This result shows that about four-vehicle driving cases reflect pavement conditions in a lane that drivers can experience.

The performance of different data combination cases was compared. The majority of vehicle response-based IRI estimation methods only utilize vertical acceleration. However, the angular velocity for vehicle pitch motion also represents the vehicle dynamics influenced by the road roughness. Also, the dynamic characteristics of the angular velocity measured from the gyroscope are independent of the vehicle's measurement location. Two different data combinations were compared with case 3. Case 4 and 5 use only two sensor measurements. Therefore, the smaller image (i.e., 150×2) was used for input. Case 4 and 5 were trained and evaluated. All averaged (i.e., 18 vehicles) RMSE was used for comparison.

The comparison showed that the use of three data (i.e., driving speed, acceleration, angular velocity) showed the best result among the three cases. Case 5 without an accelerometer showed the worst performance in that high IRI peaks were not detected well. Case 4 showed similar accuracy to case 3. However, the full utilization of three data showed the best result.

Localized IRI with an 8.05 m evaluation length has the advantage of identifying objectionable and hazardous road segments. However, the longer segment is also widely used in practice, such as 16.1 m, 100 m, 161 m, 200 m, and so on.

Every 20 localized IRIs were averaged for scaling down to 161 m (0.1 mile) intervals and compared with 161 m interval Kolb Rd northbound IRI data. The RMSE was calculated as 0.31 m/km, much lower than the localized IRI case. Because the misaligned GPS affects RMSE due to the localized IRI's short evaluation length. However, the 161 m interval was much less prone to GPS error and reflected a more generalized roughness index. The IRI ranges around 0~2 km region with fluctuating IRI were underestimated. Because the localized IRI has underestimated cases due to an imbalanced dataset. However, the overall averaged IRI was comparable with reference IRI.

The smartphone crowdsourced IRI estimation method's key challenge is the robustness of accuracy from uncertainties such as different vehicle types, models, smartphone models, driving speed, and smartphone mount types. This study overcomes such practical limitations by developing a novel deep learning model with plenty of real-world data, which considers the uncertainties mentioned above. A total of 58 real-world datasets were collected on Kolb Rd., Tucson, AZ from 28 different passenger vehicles, nine different smartphone models, and five types of mounts under variable speed conditions. A GPS processing technique was proposed to enhance the limited smartphone GPS accuracy and grid-based IRI data management. A novel CNN called IRI-Net was developed to evaluate IRI from vehicle dynamics measurement in an end-to-end manner. The trained IRI-Net was able to estimate IRI in real-world conditions independent of vehicle models, smartphones, mounts, and driving speed. The individual IRI estimation results were comparable with reference IRI but improved the accuracy by averaging. The practical uncertainties of smartphone-based crowdsourcing were discussed concerning driving path, limited GPS accuracy, and imbalanced dataset. The effect of dataset quantity was discussed in that four-vehicle driving cases were enough for convergence and showed a smoother trend than reference IRI. The multimeric data combination effect was discussed that utilizing driving speed, acceleration, and angular velocity showed the best result. Scaling to a longer IRI evaluation length to 161 m also showed good accuracy with huge RMSE improvement to 0.31 m/km. The proposed smartphone crowdsourced IRI estimation method showed great promise to leverage vehicle-mounted smartphones as individual IRI estimators with good accuracy. It should be noted that the IRI accuracy would be improved with a more variant dataset. We believe that the crowdsourced pavement condition will provide a real-time digital twin of road networks without excessive effort in the near future. This method also will help any local agency that does not afford an inertial profiler system. The real-time road network information will be beneficial not only for real-time road roughness estimation but post-disaster road damage identification and asset management planning.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, are exemplary, and are not intended in any way to limit the scope of the claims to the particular features having the corresponding reference numbers in the drawings.

What is claimed is:

1. A system for estimating road roughness under real-world driving conditions through training and implementation of a convolutional neural network (CNN) (210), the system comprising:

a. a plurality of computing devices (100), wherein each computing device (110) is mounted to a vehicle (130), wherein each computing device (110) is capable of measuring, while the vehicle (130) is driving on a road, a plurality of parameters comprising:

i. global positioning system (GPS), ii. driving speed, iii. vertical acceleration, and iv. angular velocity of pitch motion; and b. a neural network computing device (200) communicatively coupled to the plurality of computing devices (100), the neural network computing device (200) comprising the CNN (210), the CNN (210) comprising a plurality of convolutional layers;

wherein the CNN (210) is capable of accepting the plurality of parameters from the plurality of computing devices (100) as input and generating an international roughness index (IRI) value of the road as output based on the input without calibration of the plurality of computing device (100).

2. The system of claim 1, wherein the CNN (210) comprises 7 convolutional layers and a plurality of global average pooling layers.

3. The system of claim 1, wherein each convolutional layer is zero-padded to maintain spatial features, batch normalized to accelerate training speed and prevent overfitting, and has leaky-relu activation for non-linear operations.

4. The system of claim 1, wherein the plurality of computing devices (100) comprise a plurality of portable computing devices, a plurality of vehicle-embedded computing devices, or a combination thereof, wherein each computing device (110) of the plurality of computing devices (100) is mounted to the vehicle (130) by a mounting device (120) selected from a group comprising a vent clip, a vent magnet, a section clip, a suction magnet, and a CDP clip.

5. The system of claim 1, wherein measuring GPS comprises GPS resolution enhancement by interpolation and grid snapping.

6. The system of claim 1, wherein the plurality of computing devices (100) are capable of measuring vertical acceleration and angular velocity at 100 Hz.

7. The system of claim 1, wherein each parameter of the plurality of parameters is converted into a fixed-size image array before being used as input to the CNN (210).

8. The system of claim 1, wherein a batch size of the CNN (210) is 64 and a learning rate of the CNN (210) is 0.0001.

9. The system of claim 1, wherein the CNN (210) is trained by a data set comprising previous data from the plurality of computing devices (100) comprising the plurality of parameters.

10. A method for estimating road roughness under real-world driving conditions through training and implementation of a convolutional neural network (CNN) (210), the method comprising:

a. mounting a computing device (110) to a vehicle (130);
b. measuring, by the computing device (110), while the vehicle (130) is driving on a road, a plurality of parameters comprising:
i. global positioning system (GPS),
ii. driving speed,
iii. vertical acceleration, and
iv. angular velocity of pitch motion;
c. transmitting the plurality of parameters as input to a neural network computing device (200) communicatively coupled to the computing device (110), the neural network computing device (200) comprising a CNN (210) comprising a plurality of convolutional layers;
d. processing, by the CNN (210), the input from the computing device (110) to generate an IRI value of the road as output without calibration of the plurality of computing device (100).

11. The method of claim 10, wherein the CNN (210) comprises 7 convolutional layers and a plurality of global average pooling layers.

12. The method of claim 10, wherein the plurality of convolutional layers comprises 7 convolutional layers.

13. The method of claim 10, wherein each convolutional layer is zero-padded to maintain spatial features, batch normalized to accelerate training speed and prevent overfitting, and has leaky-relu activation for non-linear operations.

14. The method of claim 10, wherein the computing device (100) is selected from a group comprising a portable computing device, a vehicle-embedded computing device, or a combination thereof, wherein the computing device (100) is mounted to the vehicle (130) by a mounting device (120) selected from a group comprising a vent clip, a vent magnet, a section clip, a suction magnet, and a CDP clip.

15. The method of claim 10, wherein measuring GPS comprises GPS resolution enhancement by interpolation and grid snapping.

16. The method of claim 10, wherein the computing device (110) is capable of measuring vertical acceleration and angular velocity at 100 Hz.

17. The method of claim 10, wherein each parameter of the plurality of parameters is converted into a fixed-size image array before being used as input to the CNN (210).

18. The method of claim 10, wherein a batch size of the CNN (210) is 64 and a learning rate of the CNN (210) is 0.0001.

19. The method of claim 10, wherein the CNN (210) is trained by a data set comprising previous data from the plurality of computing devices (100) comprising the plurality of parameters.

* * * * *